United States Patent [19]
Smith et al.

[11] Patent Number: 6,164,323
[45] Date of Patent: Dec. 26, 2000

[54] SOLENOID VALVE CONTROL SYSTEM

[75] Inventors: William S. Smith, San Antonio de Belen, Costa Rica; Shawn M. Stover, Louisville, Ky.

[73] Assignee: Numatics, Incorporated, Highland, Mich.

[21] Appl. No.: 09/351,491

[22] Filed: Jul. 12, 1999

[51] Int. Cl.[7] .......................... F16K 37/00; F15B 13/043
[52] U.S. Cl. .................. 137/554; 137/625.64; 137/884; 251/129.15
[58] Field of Search ............................... 137/554, 625.64, 137/884; 251/129.15

[56] References Cited

U.S. PATENT DOCUMENTS

| | | | |
|---|---|---|---|
| 5,348,047 | 9/1994 | Stoll et al. | 137/884 |
| 5,443,093 | 8/1995 | Stoll et al. | 137/625.64 X |
| 5,522,431 | 6/1996 | Bonacorsi et al. . | |
| 5,558,126 | 9/1996 | Hyashi et al. | 137/625.64 |
| 5,584,466 | 12/1996 | Fukano et al. | 251/129.15 X |
| 5,603,355 | 2/1997 | Miyazoe et al. | 137/625.64 |
| 5,632,468 | 5/1997 | Schoenmeyr | 251/129.15 |
| 5,915,666 | 6/1999 | Hayashi et al. | 137/884 X |
| 5,964,244 | 10/1999 | Hiramatsu et al. | 137/624.64 X |
| 5,996,609 | 12/1999 | Akimoto et al. | 137/625.64 X |
| 6,053,198 | 4/2000 | Atkin et al. | 137/554 X |

FOREIGN PATENT DOCUMENTS 0 099 941  2/1984  European Pat. Off. .......... 251/129.15

*Primary Examiner*—Gerald A. Michalsky
*Attorney, Agent, or Firm*—Reising, Ethington, Barnes, Kisselle, Learman & McCulloch, P.C.

[57] ABSTRACT

A solenoid valve that includes a valve body in which a valve spool is slidably mounted, and a solenoid assembly mounted at one end of the valve body. The solenoid assembly includes a solenoid having a plunger operatively coupled to the spool and a solenoid coil for actuating the plunger. A solenoid valve driver circuit includes a circuitboard assembly that has a power supply responsive to external power for supplying electrical power to the driver circuit and the solenoid coil, and a microprocessor-based control circuit responsive to external control signals for controlling actuation of the solenoid coil. The solenoid assembly, including the solenoid and the circuitboard assembly, comprises a unitary molded or potted assembly.

8 Claims, 4 Drawing Sheets

SOLENOID VALVE CONTROL SYSTEM

The present invention is directed to solenoid-actuated fluid control valves, and more particularly to an electronic system for actuating and controlling solenoid valves.

BACKGROUND AND OBJECTS OF THE INVENTION

Solenoid valve systems for controlling flow of hydraulic or pneumatic fluid have been used in automated manufacturing equipment, production lines and numerous industrial applications. A plurality of solenoid valves typically are mounted on a manifold having a plurality of passages for supplying fluid to the valves and providing passages for connecting fluid couplings to various outlet ports of each valve. Each solenoid of each valve typically is separately electrically wired to an electronic system for controlling operation of the several solenoids and valves. The controller may be located at a position remote from the manifold assembly, requiring a multiplicity of extended conductor lengths for individual connection to the valve solenoids.

U.S. Pat. No. 5,522,431 discloses an improved solenoid valve manifold system in which each solenoid is mounted on one side face of a manifold module. The several modules are mounted end-to-end to form a manifold with interconnected through-passages for feeding fluid to and from the several valves. Each manifold module has a terminal block and valve control electronics for hard-wire connection to input/output connectors at the ends of the manifold, and for connection to the associated valve solenoids(s). Although the modular manifold system so disclosed addresses and overcomes problems theretofore extant in the art, further improvements remain desirable. In particular, the manifold system disclosed in the noted patent requires extensive interconnection by hand-wiring, greatly increasing the cost and complexity of manufacture, field installation and repair.

Copending application Ser. No. 08/980,668 filed Dec. 1, 1997, now U.S. Pat. No. 6,053,198, discloses a fluid control system that includes a fluid manifold having a plurality of manifold bodies fastened to each other end-to-end so as to form one or more fluid passages extending through the manifold. A solenoid valve is mounted on a side of at least one of the manifold bodies with fluid ports opening into the manifold body to the fluid passages extending therethrough. An electrical input/output connection is mounted at one end of the manifold for receiving control signals from an external source. A circuitboard arrangement extends within the manifold from the input/output connection and has conductors printed thereon for connecting the input/output connection to the solenoids of the various valves. Each of the manifold bodies includes a passage that extends in assembly through the entire manifold offset from the fluid passages and through which the circuitboard arrangement extends for connection to the various solenoid valves. Both the circuitboard passages and the fluid passages comprise through-passage segments in each of the manifold bodies that align with each other when the bodies are assembled end-to-end to form the manifold. The circuitboard arrangement preferably comprises a plurality of individual circuitboards disposed one within each of the manifold bodies, the various circuitboards being electrically interconnected in series. Each of the circuitboards includes complementary male and female electrical connectors at opposed ends for connecting the boards in series, and a third connector along one lateral side disposed in assembly adjacent to the side of the manifold body on which the solenoid valve is mounted for making electrical connection from the circuitboard to the valve solenoid. This electrical interconnection is made through an opening in the side of the manifold body that is sealed by the electrical interconnection to the valve solenoid. The circuitboards in the preferred embodiments of the invention are provided in two forms, one providing a single output for lateral connection to a single-solenoid valve, and the other providing dual outputs for lateral connection to a dual-solenoid valve. The conductors printed on the circuitboards are arranged such that the output or outputs to the solenoid valve are always taken from the same connection terminal(s) at the upstream connector, with the remaining connector terminals being interconnected in such a way that the control signals for the remaining solenoid valves on the manifold are sequentially presented at the selected terminal (s) of the connectors.

The solenoid valves in this copending application comprise a valve body having a spool for selectively controlling flow of fluid through the valve body from and to the manifold, and from and to the output ports on each manifold body. A solenoid is mounted on one end of the valve body, and has an actuator operatively coupled to the valve spool. A valve control circuitboard is sandwiched between the solenoid and the valve body. The valve circuitboard has a first valve connector for interconnection with the third connector on the circuitboard in the underlying manifold body, and a second connector for connection to the coil of the solenoid in such a way that mounting of the solenoid onto the valve body automatically implements electrical connection to the valve control circuitboard. In implementations in which dual-solenoid valves are employed, with solenoids being mounted on opposed ends of the valve body, a solenoid interconnection extends through the valve body at a position offset from the valve spool for interconnecting the second solenoid with the solenoid control circuitboard. Fluid control means, such as a pressure regulator or a velocity controller, may be mounted between the solenoid valve and the corresponding manifold body side face. Electrical connection between the third connector of the circuitboard within the manifold body and the solenoid control board sandwiched between the solenoid and the valve body is made by a valve interconnection circuitboard that extends through the fluid controller.

It is a general object of the present invention to provide a solenoid valve control system, particularly a solenoid valve assembly, in which the solenoid and the associated control circuitry are provided as a unitary molded or potted assembly. Another and related object of the invention is to provide a solenoid valve assembly that achieves the foregoing objective, and that is characterized by reduced power consumption and reduced operating temperature as compared with the prior art. Yet another object of the present invention is to provide a solenoid valve assembly that includes embedded control circuitry for diagnosing operating condition of the solenoid coil.

SUMMARY OF THE INVENTION

A solenoid valve in accordance with the present invention includes a valve body in which a valve spool is slidably mounted, and a solenoid assembly mounted at one end of the valve body. The solenoid assembly includes a solenoid having a plunger operatively coupled to the spool and a solenoid coil for actuating the plunger. A solenoid valve driver circuit includes a circuitboard assembly that has a power supply responsive to external power for supplying electrical power to the driver circuit and the solenoid coil, and a microprocessor-based control circuit responsive to external control signals for controlling actuation of the solenoid coil. The solenoid assembly, including the solenoid and the circuitboard assembly, comprises a unitary molded or potted assembly in accordance with the preferred embodiment of the invention.

In accordance with one aspect of the present invention, the solenoid valve microprocessor-based control circuit includes facility for monitoring operative condition of the solenoid coil. The control circuit includes an electronic switch connected in series with the solenoid coil and a microprocessor for applying signals to the electronic switch for selectively actuating the coil. Circuitry is connected in parallel with the electronic switch for detecting current through the coil when the switch is turned off. This circuitry preferably comprises a pulldown resistor connected across the electronic switch. The resistor is connected to a terminal of the control microprocessor for monitoring voltage across the resistor when the electronic switch is turned off. A zener diode is connected across the pulldown resistor for limiting the voltage drop across the resistor to the supply voltage of the microprocessor. An LED is responsive to the microprocessor for indicating operative condition of the solenoid coil. In the preferred embodiment of the invention, the microprocessor blinks the LED to provide an indication to an operator or observer that a solenoid coil failure has been detected.

In accordance with another aspect of the present invention, the microprocessor-based controller is responsive to external control signals for initially applying power at 100% duty cycle to the solenoid coil to activate the valve, and thereafter applying power at reduced duty cycle to maintain activation of the valve at reduced power consumption. This feature or aspect of the invention achieves the aforestated objectives of reducing current draw and operating temperature at the valve.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosures of U.S. Pat. No. 5,522,431 and copending U.S. application Ser. No. 08/980,668 filed Dec. 1, 1997, now U.S. Pat. No. 6,053,198, both assigned to the assignee hereof, are incorporated herein by reference.

Figure 1:
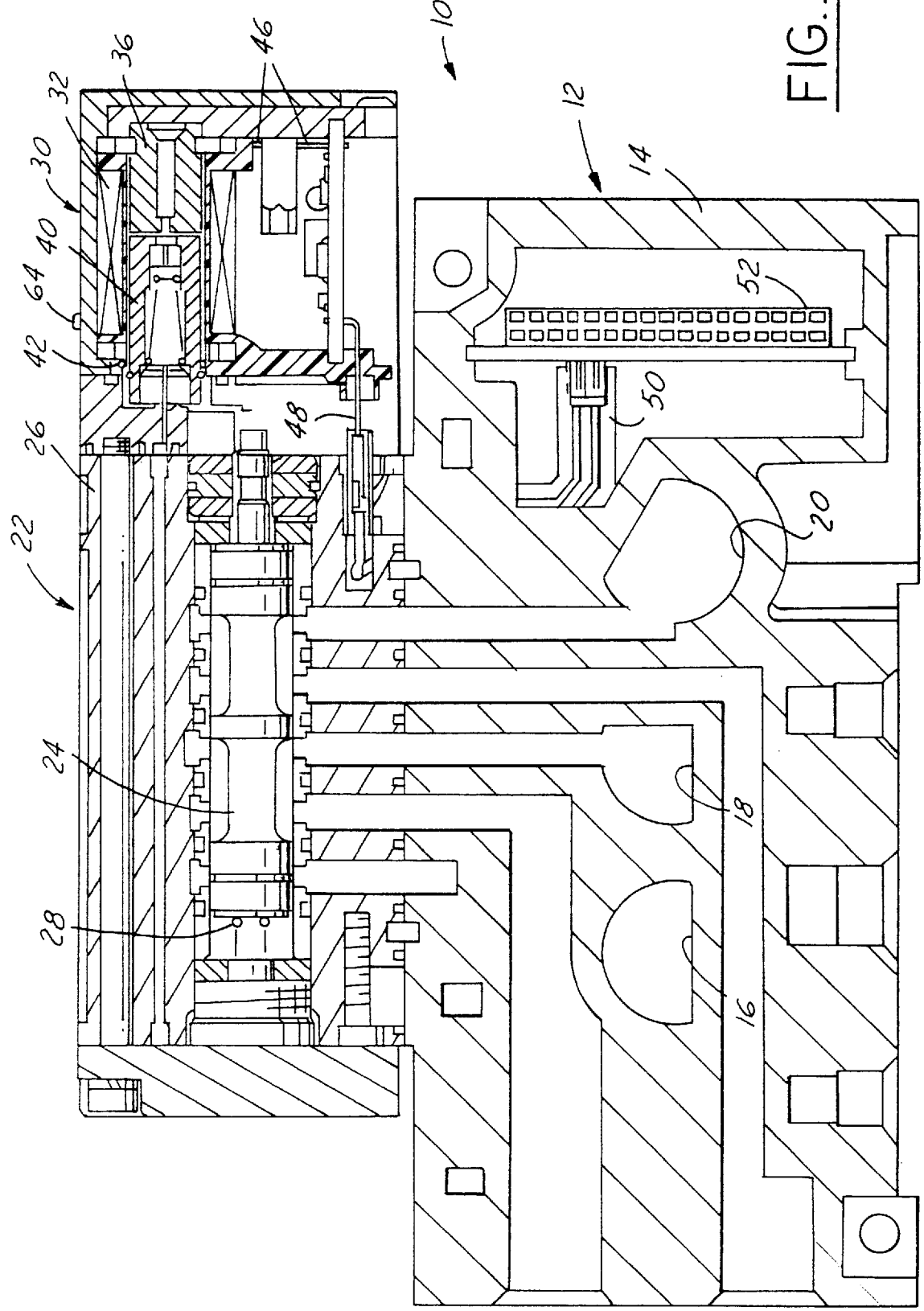
FIG. 1 is a sectional view of a solenoid valve control system in accordance with one implementation of the invention.

FIG. 1 illustrates a solenoid valve control system 10 in accordance with one implementation of the invention. A manifold 12 comprises a series of manifold bodies 14 connected to each other in facing engagement as disclosed in the above-referenced copending application. Fluid passages 16, 18, 20 extend through each manifold body 14, and through manifold 12 as a whole. Fluid passages extend laterally from passages 16, 18, 20 to supply fluid to a solenoid valve 22 mounted on manifold body 14. The embodiment of the invention illustrated in FIGS. 1–3 comprises a solenoid valve 22 having a spool 24 slidably mounted within a valve body 26. Spool 24 is biased in one direction by a coil spring 28, and is movable in the opposing direction as a function of fluid pressure applied to the opposing end of the spool. This fluid pressure is controlled by a solenoid assembly 30 carried at the associated end of valve body 26. Although the invention will be described in detail in connection with such a single-solenoid valve assembly, it will be understood that the invention is also equally applicable to dual-solenoid valve assemblies, in which a solenoid 30 is mounted at each end of valve body 26.

Figure 2:
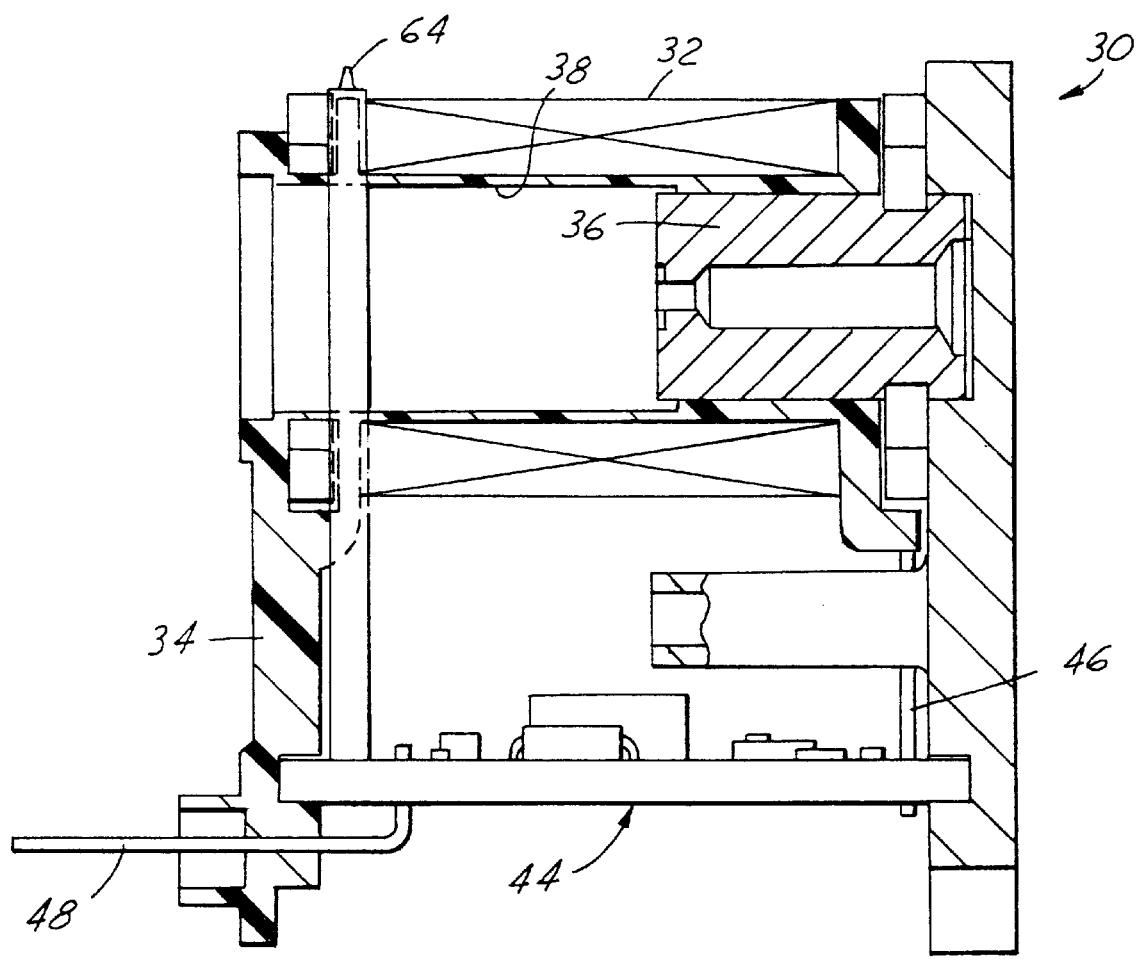
FIG. 2 is a sectioned elevational view on an enlarged scale of the solenoid assembly illustrated in FIG. 1.
Figures 3, 4:
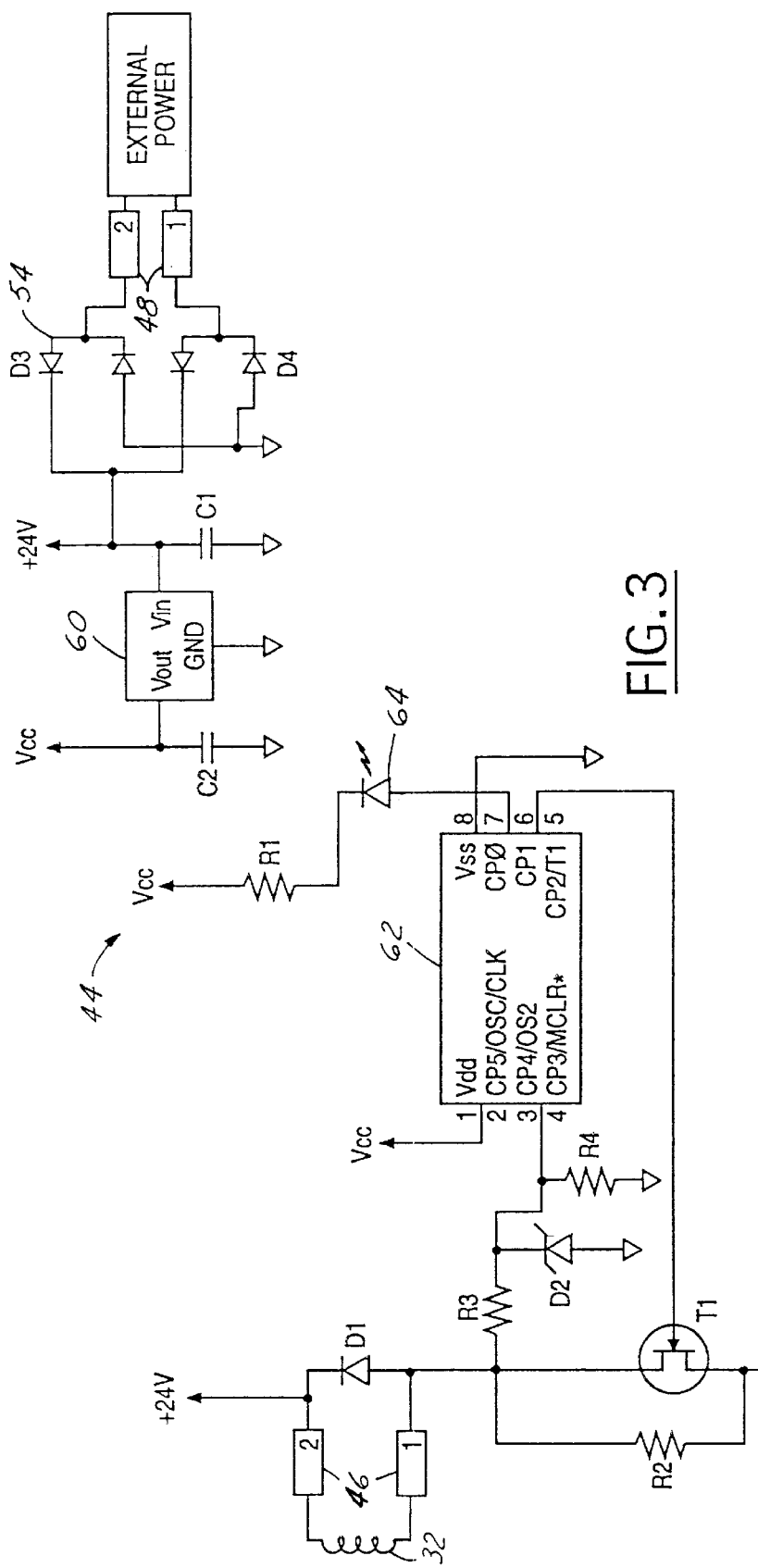
FIG. 3 is a functional block diagram of the valve control circuit in the assembly of FIGS. 1 and 2.
FIG. 4 is a timing diagram that illustrates energization of the solenoid valve in FIGS. 1–3 in accordance with one aspect of the present invention.

Referring to FIGS. 1–2, solenoid assembly 30 comprises a solenoid coil 32 molded or otherwise secured to an insulating frame 34. A ferromagnetic core 36 is carried by frame 34 and cooperates with coil 32 to define a plunger cavity 38. A plunger or armature 40 (FIG. 1) is captured in assembly within cavity 38, and is biased away from core 36 by a coil spring 42. A circuitboard assembly 44 is captured between opposed sides of frame 34 offset from coil 32. Circuitboard assembly 44 is connected to coil 32 by a pair of leads 46 (FIGS. 1–3). A second pair of terminals 48 extend from assembly 44 for connection in assembly (FIG. 1) through an interconnection card 50 to a circuitboard 52 carried by manifold body 14, and thence to a source 54 (FIG. 3) of external control signals in accordance with the disclosure of the above-referenced copending application.

Circuitboard assembly 44 is illustrated functionally in FIG. 3. A diode bridge 54 receives power from an external source 56 through terminals 48, and applies rectified power to a voltage regulator 60 across a capacitor C1. The output of voltage regulator 60 is connected across a capacitor C2. A microprocessor 62 applies valve control signals to the gate of a MOSFET switch T1. Switch T1 is connected in series with solenoid coil 32 through contacts 46 across power supply capacitor C1. The parallel combination of a resistor R4 and a zener diode D2 is connected in series with a resistor R3 across the primary current conducting electrodes (source and drain) of MOSFET switch T1. A resistor R2 is also connected across the current conducting electrodes of MOSFET switch T1. In response to a valve control signal from external source 54, microprocessor 62 turns on MOSFET switch T1, drawing current through coil 32 and thereby energizing the solenoid valve. A diode D1 is connected in reverse polarity across coil 32 to suppress ringing in the coil. Where the control signal to MOSFET switch T1 is terminated, the MOSFET switch becomes non-conductive, and coil 32 is de-energized. When the coil is thus de-energized, resistor R2 functions as a pulldown resistor. If coil 32 is present and conducting, the voltage at the junction of resistors R2, R3 will be above a threshold level at the input/output pin of microprocessor 62 to which it is connected, and the microprocessor will thus sense the presence and operative condition of the coil. On the other hand, if coil 32 is an open circuit, resistor R2 pulls the voltage at the junction of resistors R2, R3 below this threshold level, and the microprocessor detects absence of an operative coil. Diode D2 limits the voltage at the microprocessor I/O pin to the microprocessor supply voltage. The condition of coil 32 can be sensed when the coil is turned off, or at times when a low signal is applied to switch T1 during duty-cycle operation of the valve.

Microprocessor 62 is connected to an LED 64 (FIG. 2) for indicating the operative condition of coil 32 and solenoid valve 30 externally of the solenoid valve. That is, in the event that an open condition is detected at coil 32, microprocessor 62 blinks LED 64. Otherwise, LED 64 is illuminated when valve 30 is energized.

FIG. 4 illustrates another aspect of the present invention. FIG. 4 illustrates a control signal applied by microprocessor 62 to the gate of MOSFET switch T1. When coil 32 is to be initially energized, a continuous high signal 66 is applied to the gate of the MOSFET switch, which is to say that switch T1 is energized at 100% duty cycle. After a period of time sufficient to allow the solenoid valve to actuate—e.g, fifty milliseconds—the signal is modified to that illustrated at 68 at reduced duty cycle—e.g, 50% duty cycle. This feature reduces overall current draw from external power source 56, and reduces operating temperature.

Preferably, solenoid 30 is molded or potted in assembly. Plunger 40 (FIG. 1) may be hydraulically coupled at pilot pressure to spool 24 as shown, or may be a directly mechanically coupled to the spool.

Figure 5:
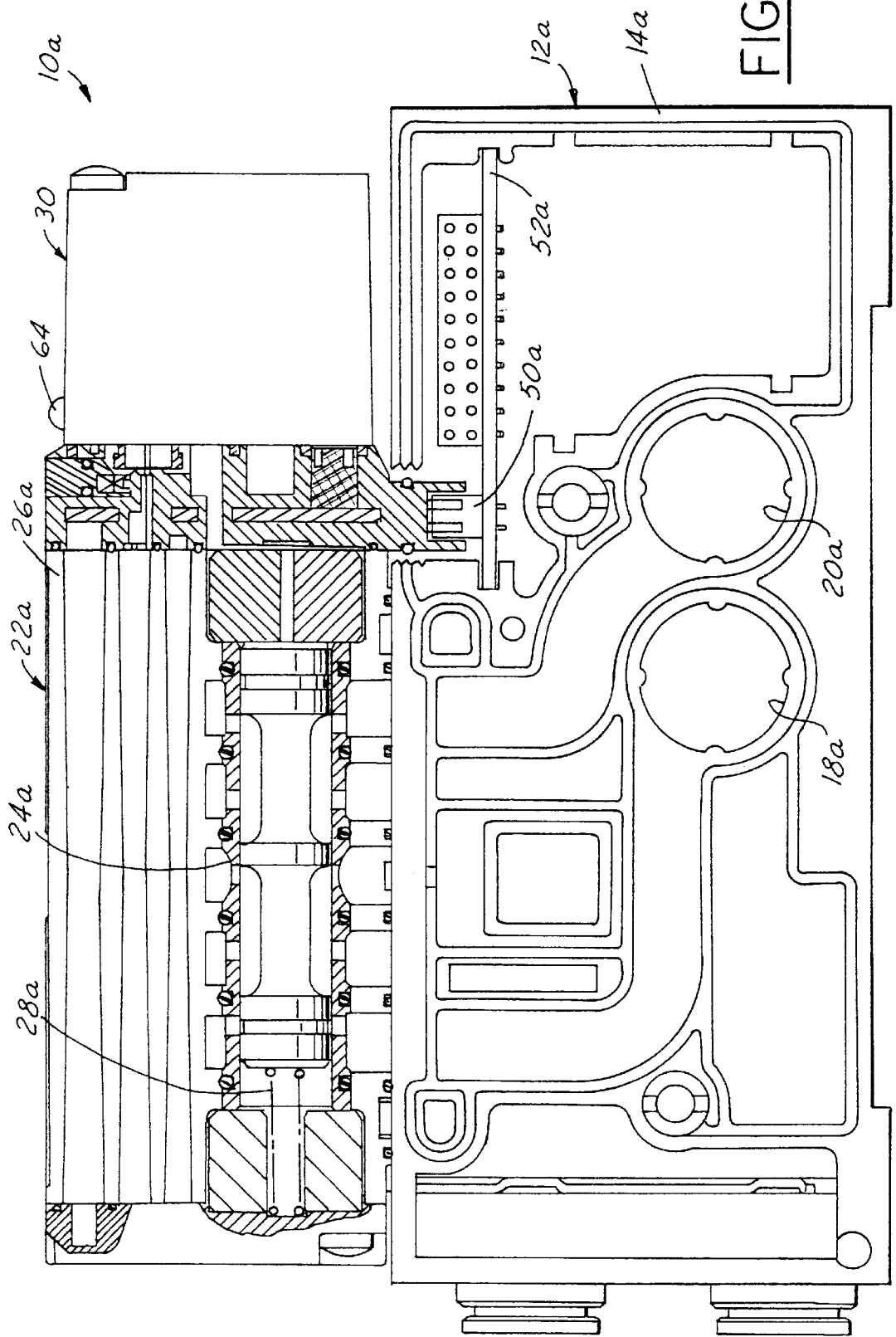
FIG. 5 is a sectional view similar to that of FIG. 1 but showing a modified, presently preferred embodiment of the invention.

FIG. 5 illustrates a presently preferred modification to FIG. 1 in which equivalent elements are identified by corresponding reference numerals followed by the suffix "a".

What is claimed is:

1. A solenoid valve that comprises:

a valve body in which a valve spool is slidably mounted, and a solenoid assembly mounted at one end of said valve body, said solenoid assembly comprising:

a solenoid having a plunger operatively coupled to said spool and a solenoid coil for actuating said plunger, and a solenoid valve driver circuit including a circuitboard assembly carried as part of said solenoid assembly, said circuitboard assembly having a power supply responsive to external power for supplying power to said driver circuit and said solenoid, and a microprocessor-based control circuit responsive to external control signals for controlling actuation of said solenoid coil, said control circuit including an electronic switch having primary current conducting electrodes connected in series with said solenoid coil across a power source and a control electrode for receiving valve control signals from said control circuit, and means for monitoring conductive condition of said coil, said means being connected across said electronic switch between said primary current conducting electrodes, in parallel with said electronic switch and in series with said coil across said power source, for detecting current through said coil from said power source when said electronic switch is non-conductive.

2. The valve set forth in claim 1 wherein said means connected in parallel with said switch includes a resistor connected between said primary current conducting electrodes across said switch, and means connecting said resistor to said microprocessor-based control circuit for providing to said control circuit a signal indicative of conductive condition of said coil when said switch is non-conductive.

3. The valve set forth in claim 2 wherein said means connecting said resistor includes a zener diode for limiting voltage applied from said resistor to said microprocessor-based control circuit.

4. The valve set forth in claim 1 further comprising means coupled to said monitoring means for indicating conductive condition of said coil.

5. The valve set forth in claim 4 wherein said means coupled to said monitoring means comprises an LED.

6. The valve set forth in claim 5 wherein said control circuit includes means for flashing said LED when said coil is open.

7. The valve set forth in claim 1 wherein said control circuit comprises means responsive to said external control signals for internally applying power at 100% duty cycle to said coil to activate said valve, and thereafter applying power at reduced duty cycle to maintain activation of said valve at reduced power consumption.

8. The valve set forth in claim 1 wherein said solenoid assembly, including said solenoid and said circuitboard assembly, comprises a unitary molded assembly.

* * * * *